(12) United States Patent
Gonthier

(10) Patent No.: US 6,466,717 B1
(45) Date of Patent: Oct. 15, 2002

(54) OPTICAL FIBER FILTERS AND METHOD OF MAKING THE SAME

(75) Inventor: François Gonthier, Ville Mont-Royal (CA)

(73) Assignee: ITF Optical Technologies Inc., Montreal (CA)

( * ) Notice: Subject to any disclaimer, the term of this patent is extended or adjusted under 35 U.S.C. 154(b) by 0 days.

(21) Appl. No.: 09/622,545

(22) PCT Filed: Jan. 3, 2000

(86) PCT No.: PCT/CA00/00012

§ 371 (c)(1), (2), (4) Date: Aug. 15, 2000

(87) PCT Pub. No.: WO00/41016

PCT Pub. Date: Jul. 13, 2000

(30) Foreign Application Priority Data

Jan. 6, 1999 (CA) .............................................. 2258140

(51) Int. Cl.⁷ ................................................ G02B 6/26
(52) U.S. Cl. .......................................... 385/43; 385/28
(58) Field of Search ............................. 385/15, 24, 27, 385/28, 39, 43

(56) References Cited

U.S. PATENT DOCUMENTS 4,946,250 A   8/1990  Gonthier et al. ......... 350/96.29
5,195,151 A * 3/1993  Campbell et al. ............. 385/42
5,694,512 A * 12/1997 Gonthier et al. ............ 385/140

FOREIGN PATENT DOCUMENTS

| CA | 1284282 | 5/1991 | .................. 88/97.2 |
| DE | 3034873 | 3/1982 | ........... C03B/37/14 |
| EP | 0793124 | 9/1997 | ........... G02B/6/293 |
| JP | 56075602 A * | 6/1981 | ........... G02B/05/14 |

OTHER PUBLICATIONS

S. Lacroix, F. Gonthier, J. Bures, "All–Fiber Wavelength Filter from Successive Biconical Tapers", Optics Letters, vol. 11, No. 10, pp. 671–673, Oct. 1986.*

* cited by examiner

Primary Examiner—Cassandra Spyrou
Assistant Examiner—Arnel C. Lavarias
(74) Attorney, Agent, or Firm—George J. Primak

(57) ABSTRACT

An optical fiber filter is produced which has a sinusoidal response or a modulated sinusoidal response with any desired amplitude and wavelength period. This is achieved by first producing an elongated adiabatic taper in a single-mode fiber which has been stripped of its protective jacket. Then, on the slope of this adiabatic taper, at each end of the central zone, there is formed a non-adiabatic taper such as to obtain a predetermined sinusoidal or modulated sinusoidal response in the filter.

13 Claims, 7 Drawing Sheets

OPTICAL FIBER FILTERS AND METHOD OF MAKING THE SAME

FIELD OF THE INVENTION

This invention relates to optical fiber filters and to the method of making such filters using tapered single-mode fibers. In particular, the invention provides a way of making wavelength filters with a sinusoidal response or modulated sine response having any desired filtering amplitude and period of oscillation.

BACKGROUND OF THE INVENTION

Tapered optical fiber filters are well known in the art. They are made by tapering a single-mode optical fiber in such a way as to produce an interference between cladding modes, thereby creating a transmission which is wavelength dependent.

One such tapered fiber filter is described in Canadian Patent No. 1,284,282 issued May 21, 1991. It provides a passband filter comprising a plurality of successive biconical tapered portions on a single-mode fiber, such tapered portions having different profiles to produce the desired filtering characteristic.

Also, U.S. Pat. No. 4,946,250 of Aug. 7, 1990 by Gonthier et al., discloses a passband/stopband filter which is formed of two biconical tapers each having a given profile and being separated from each other by a small distance. This enables transmission of one signal of predetermined wavelength while stopping a second signal of a different wavelength.

The difficulty in such prior art filters is that the response usually involves more than two modes, thereby producing uncontrollable modulations in-the sine response. Moreover, in a standard single-mode matched cladding fiber operation, in the 1200 to 1700 nm range, the maximum amplitude of oscillation is less than 90%, resulting in filters restricted to small filtering amplitudes of 1 to 3 dB.

OBJECTS AND SUMMARY OF THE INVENTION

It is an object of the present invention to produce optical fiber filters having a sinusoidal response with essentially any desired period and any amplitude, from 1% to 99.9%.

Another object of the invention is to produce such filters with a single tapered section on the single-mode fiber.

Other objects and advantages of the invention will be apparent from the following description thereof.

The response of the filter of the present invention can be defined by the following relation:

$$T=1-\alpha\sin^2[(\lambda-\lambda_o)\Pi/\Lambda]$$

where:

T is the optical transmission of the filter;

$\alpha$ is the amplitude of the filter;

$\lambda$ is the wavelength of the light passing through the filter;

$\lambda_o$ is a reference wavelength or center wavelength of the filter; and $\Lambda$ is the wavelength period of the filter.

In essence, according to the present invention, an optical fiber filter is provided which comprises an essentially adiabatic taper in a single-mode fiber, having an elongated central zone with a sloped portion at each end thereof, and on the slope at each end of the central zone there is provided a non-adiabatic taper, thereby forming two coupling regions at the extremities of the central zone, such as to produce a predetermined sinusoidal response in amplitude and wavelength period of the filter. This provides conditions at the extremities of the long adiabatic taper which excite LP01 and LP02 modes in a controlled fashion. When a large amplitude is desired, both modes need to be excited equally, i.e. 50% of the power must be coupled in the LP02 mode, whereas at first all power resides in the fundamental mode.

The preferred method of making such novel optical fiber filter is described below.

A single mode fiber is connected between a light source setup and a detector setup. The light source setup provides the ability to switch between a laser source and a broadband source, both of them operating in the 1550 nm window. The detector setup allows the light to be switched between a photodetector and a spectrum analyzer, so that the response at a given wavelength of the filter can be determined with the laser and the photodetector, whereas the spectral response of the filter can be monitored using the broadband source and the spectrum analyzer. Prior to commencing the operation, the light sources and the detectors are normalized so that the filter function would be relative to the resulting measurements.

The fiber is then stripped of its protective jacket over a predetermined length, for example 20 mm, and placed on a suitable fabrication setup on which the fiber is clamped at each end of the stripped section and which includes two motorized stages that can systematically pull on the fiber at each clamped end. Also the setup comprises a punctual heat source, such as a torch, which is mounted on a motorized three-axis holder allowing the flame to approach the fiber and to longitudinally brush it to simulate a wider flame.

The first step of the filter fabrication process is to produce a long essentially adiabatic taper on the fiber's stripped section. For example, if the fiber is stripped of its protective coating over 20 mm, the adiabatic taper may be produced by heating the stripped section with the heat source, e.g. a torch with flame, and pulling it another 20 mm, thereby creating a reduction in diameter of about 50%. The flame of the torch is made to brush the fiber over a certain length, e.g. 6 mm or more, to produce the adiabatic condition of the taper, i.e. a taper that does not cause higher order cladding modes to be excited. Since no extra modes are excited at this stage, all power stays in the fundamental mode and the transmission power remains constant as a function of elongation produced by the pulling action. Once the adiabatic taper is finished, the torch is removed and the trace on the spectrum analyzer will show that there is no coupling, the transmission being at 0 dB.

The next fabrication steps create conditions at the extremities of the adiabatic taper produced in the first step, such as to excite the LP01 and LP02 modes in a controlled fashion. When a large amplitude is desired, both modes must be excited equally, i.e. 50% of the power must be coupled in the LP02 mode. Such coupling is realized by making a non-adiabatic taper, which is a short mixing taper, on the slopes at each end of the central zone of the adiabatic taper. For this purpose, a small flame is used with no brushing and the fiber is pulled until the power has decreased to the appropriate value, e.g. 50%. The power goes through cycles and it may be necessary to go through several cycles, e.g. 2 or 3, before reaching the 50% value. In order to produce a 50% coupling, and excite as little as possible the third mode LP03, the position of the non-adiabatic taper on each slope is critical. Such position may be determined by trial and error for various types of fibers, but when using a standard matched cladding fiber, such as SMF-28, made by Corning, the torch must be approached at a point on the slope where the diameter of the adiabatic taper is 68% of the fiber diameter. The flame size is then chosen to produce a short non-adiabatic taper with maximum amplitude coupling of around 50%.

After making the first non-adiabatic taper on one slope of the adiabatic taper, a second short non-adiabatic taper is made in like manner on the other slope to match the coupling of the first. This creates a filter structure which has two coupling regions at its extremities and a central beating region. In such structure the ratio between LP01 and LP02 can be readily controlled. As with a two-arm interferometer, if the power splitting is 50% at both ends of the device, the contrast will be maximum. This will be shown by the spectrum analyzer at successive elongation points during the formation of the second non-adiabatic taper. Once the contrast is maximum, the pulling process that forms the second non-adiabatic taper is stopped. A good indication that the two non-adiabatic tapers are matched, is the decrease of the excess loss at the transmission peaks of the filter as the elongation progresses, which loss becomes very low at the end. Thus, to achieve a desired total amplitude of the filter, one must produce non-adiabatic tapers on the slope of the adiabatic taper that are matched and have a splitting ratio of-half the total amplitude desired.

With this structure it is also possible to produce a filter with any desired period under 100 nm. Elongating the central zone of the filter, between the two non-adiabatic tapers, will increase the phase shift between the two modes and reduce accordingly the period of the filter. The transmission peak loss does not change with the period which means that changing the period is independent of the non-adiabatic tapers.

Finally, if a modulated sinusoidal response is desired, the size of the non-adiabatic or mixing tapers may be modified to make them more wavelength dependent, thus producing a modulation in the sine period of the filter.

BRIEF DESCRIPTION OF THE DRAWINGS

A preferred embodiment of the invention will now be described with reference to the appended drawings, in which:

FIG. 4 is a graph of the power as a function of elongation of the adiabatic taper obtained as shown in FIG. 3a;

FIG. 5 is a graph of the power as a function of wavelength of the adiabatic taper obtained as shown in FIG. 3a;

DETAILED DESCRIPTION OF THE PREFERRED EMBODIMENT

Figure 1:
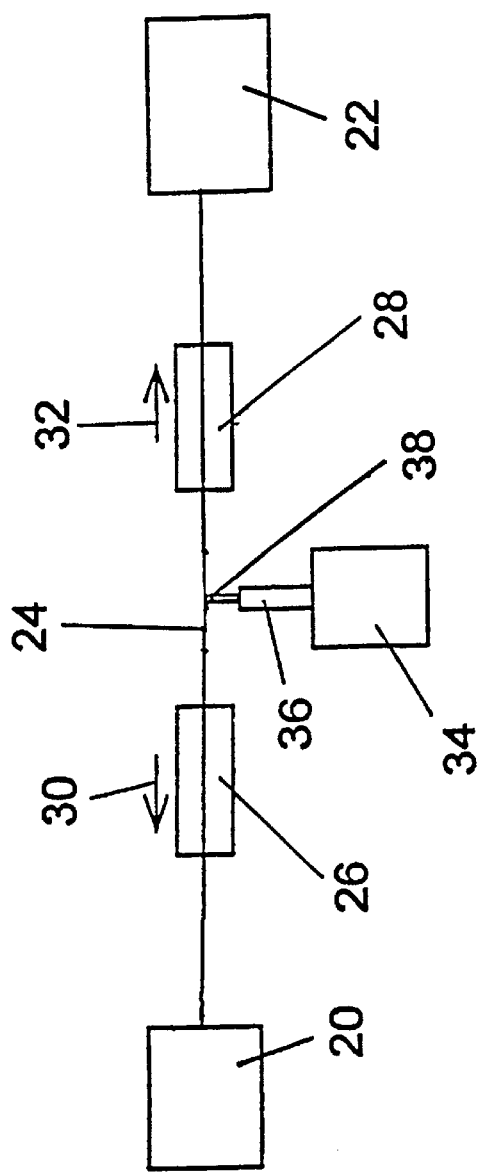
FIG. 1 is a diagrammatic view of the fabrication set-up used for the purposes of this invention.

Referring to the drawings in which the same elements are designated by the same reference numbers, FIG. 1 illustrates diagrammatically a fabrication arrangement suitable for the production of the filter in accordance with the present invention. It comprises a light source set-up 20 and a detector set-up 22. The light source set-up 20 has the ability to switch between a laser source and a broadband source, both operating in the 1550 nm window. The detector set-up 22 allows the light to be switched between a photodetector and a spectrum analyzer, so that the response at one wavelength of the filter can be determined by the laser and the detector and the spectral response of the filter can be monitored using the broadband source and the spectrum analyzer.

Fiber 24 can be any single-mode fiber provided with a core, a cladding and a protective jacket. In this example the standard matched fiber SMF-28, produced by Corning has been used. It is clamped on motorized stages 26, 28 which are movable as shown by arrows 30, 32 so as to be able to pull the fiber 24 when it has been softened by heat. A heat source 34 is provided in this example with torch 36 and flame 38. This heat source 34 is normally mounted on a three-axis motorized holder allowing the flame 38 to approach the fiber 24 and brush it longitudinally to simulate a wider flame. Any type of heat source that would produce the same effect can be used. Prior to being heated, the fiber 24 is stripped of its protective jacket, in this case over a length of approximately 20 mm, and then it is heated and pulled in sequential manner in order to produce filter 40 shown in FIG. 2. Apart from having an elongated middle zone 42 (with length A in this case that can be adjusted as required to control the period of oscillation), the filter 40 has two mixing tapers 44, 46 at the extremities of this middle zone 42, which control the amplitude of the sinusoidal response. If the power splitting is 50% at both ends of the device, the contrast will be maximum.

Figure 3:
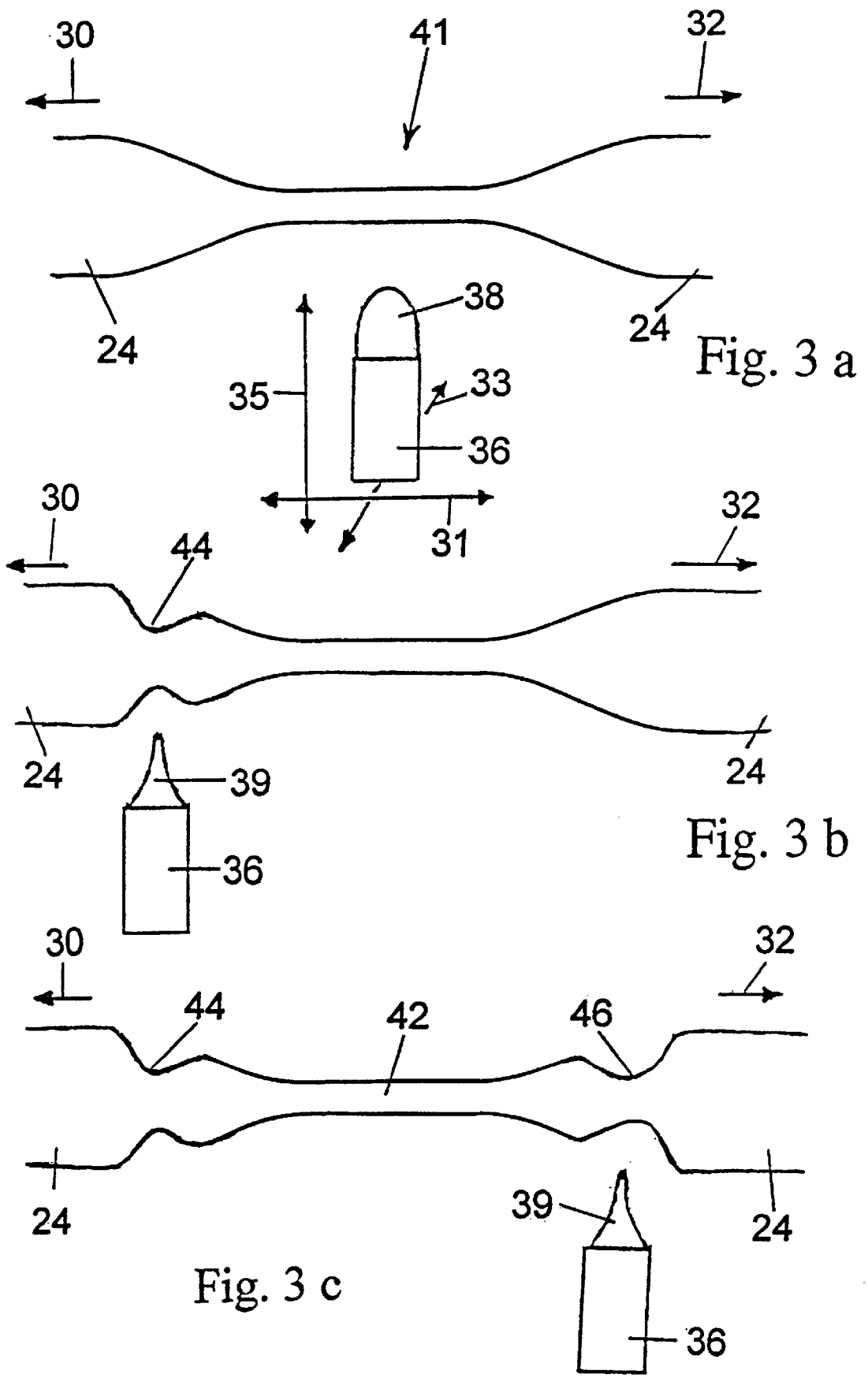
FIGS. 3a to 3c illustrate the basic steps of the method for producing the filter of the present invention.
Figure 4:
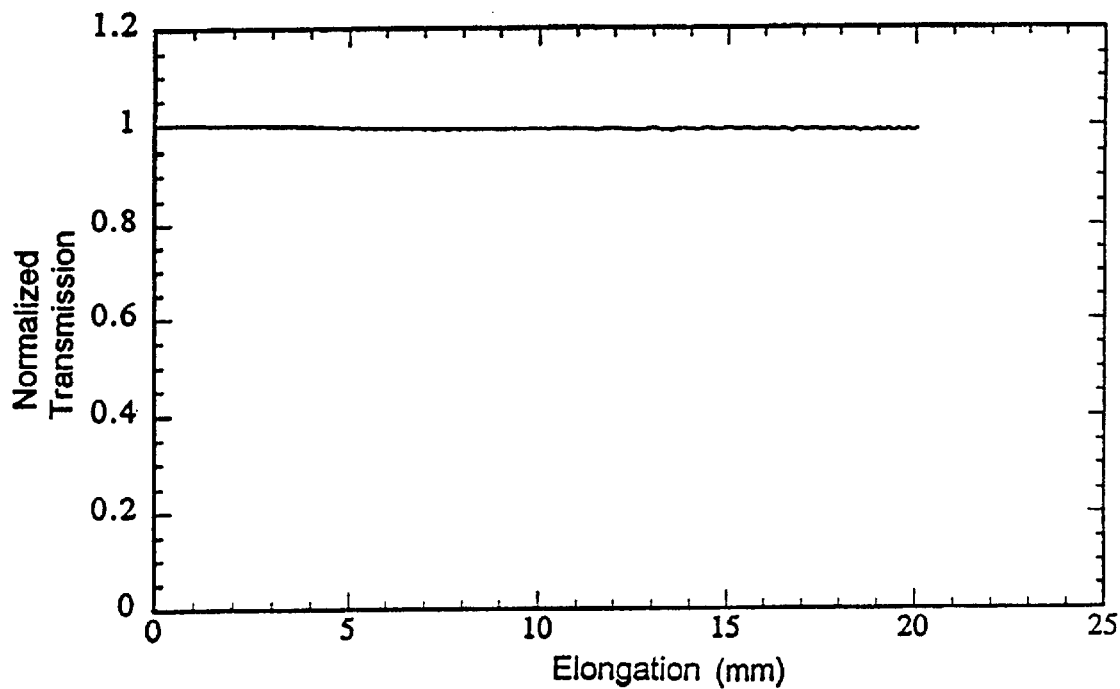
Figure 5:
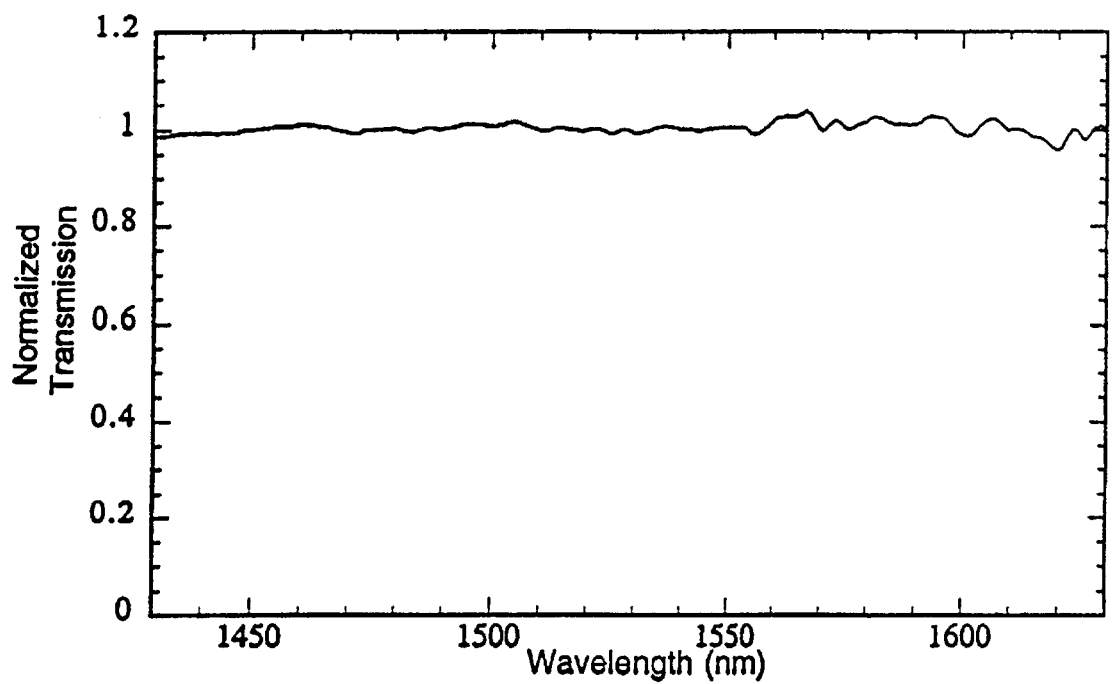

A method of producing the filter 40 is illustrated in FIGS. 3a, 3b and 3c. The first step is shown in FIG. 3a and consists of making a long (e.g. 40 mm) essentially adiabatic taper on the fiber 24 by approaching torch 36 with flame 38 to the fiber 24 and brushing the same longitudinally until the fiber 24 is soft. It is then pulled as illustrated by arrows 30, 32 to create a reduction in diameter of about 50%. To provide suitable brushing, flame 38 may be moved in three axial directions as shown by arrows 31, 33 and 35. This enables the flame 38 to brush at least 6 mm of the fiber, which allows the formation of an adiabatic taper 41, i.e. a taper that does not cause higher order cladding modes to be excited. Since no extra modes are excited, all the power stays in the fundamental mode and the transmission power remains constant as shown in FIG. 4 where the power monitored by the laser as a function of the pull length or elongation is constant. Once this adiabatic taper 41 is finished, the trace produced by the spectrum analyzer as shown in FIG. 5 also indicates that there is no coupling, the transmission being at 0 dB.

Figure 6:
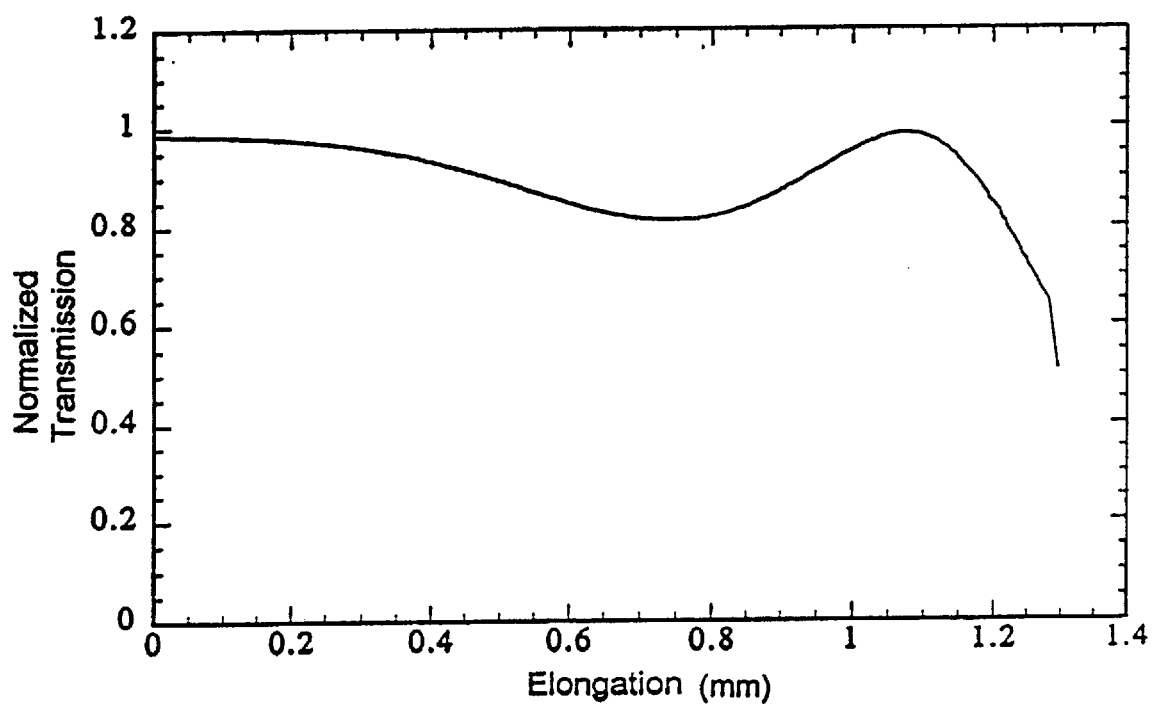
FIG. 6 is a graph of the power as a function of elongation of the device with the first non-adiabatic taper obtained as shown in FIG. 3b.
Figure 7:
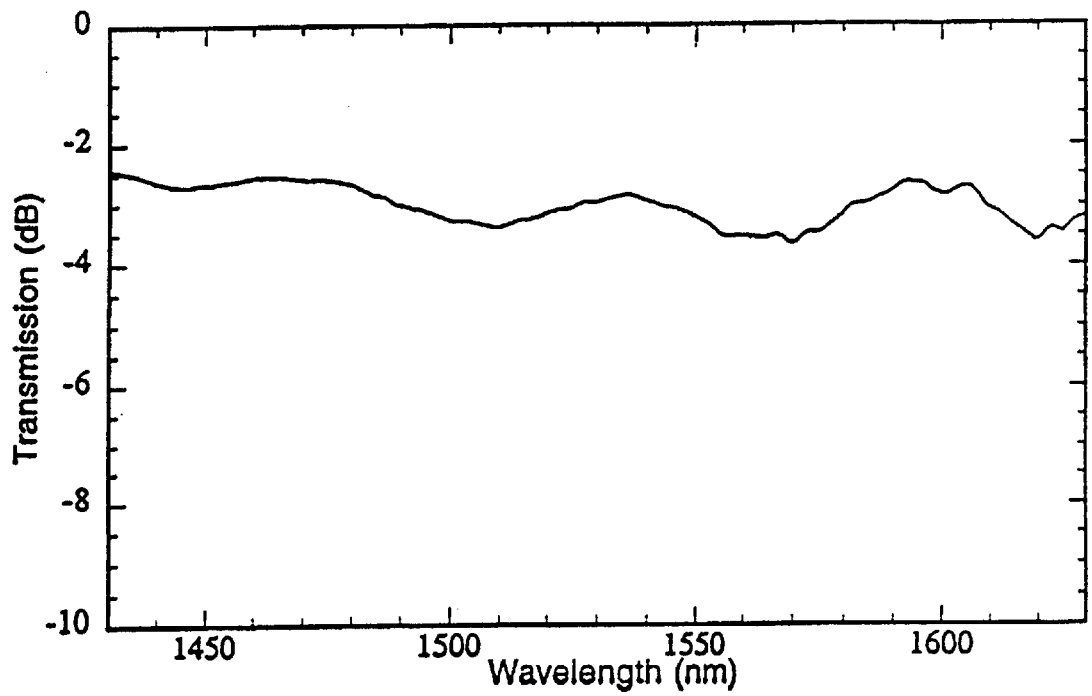
FIG. 7 is a graph of the power as a function of wavelength of the device with the first non-adiabatic taper obtained as shown in FIG. 3b.

The next fabrication steps are used to create conditions at the extremities of the adiabatic taper 41 to excite the LP01 and LP02 modes in a controlled fashion. To achieve a large amplitude, both modes must be excited equally, i.e. 50% of the power must be coupled in the LP02 mode. This coupling is realized by a non-adiabatic taper 44 formed on a slope of the adiabatic taper 41 as shown in FIG. 3b. For this purpose a small flame is used with no bushing, and the fiber 24 is slowly pulled as shown by arrows 30, 32 to achieve the appropriate value of coupling (e.g. 50%). This is graphically shown in FIG. 6. The power usually goes through cycles and it may be necessary to go through two or three cycles before reaching the 50% value. Moreover, in order to produce a 50% coupling and excite as little as possible the third mode LP03, it is important to properly position the non-adiabatic taper 44 on the slope. With the fiber used in this example, the flame 39 must be approached at a point where the diameter of the slope is 68% of the diameter of the fiber 24. The size of the flame 39 is also chosen so as to produce a maximum amplitude coupling around 50%. After fabrication of the first non-adiabatic taper 44 shown in FIG. 3b, the spectrum analyzer produces a trace shown in FIG. 7. The small oscillation present in this graph indicates that the original taper 41 obtained at FIG. 3a was not perfectly adiabatic and that a few % coupling still occurs at the other end of the taper, which is permissible.

Figure 2:
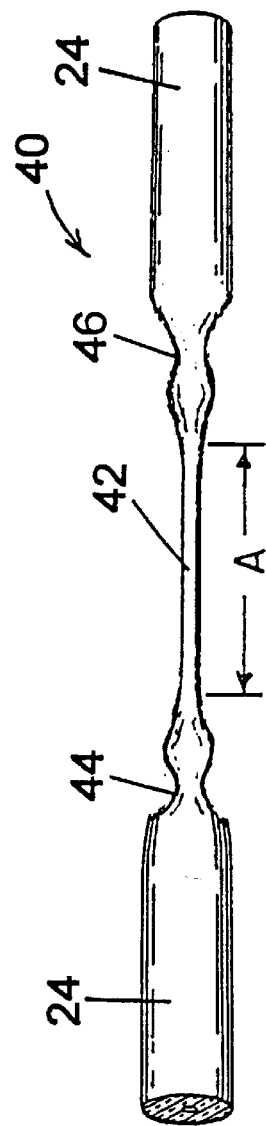
FIG. 2 is a perspective view of the filter in accordance with the present invention.
Figure 8:
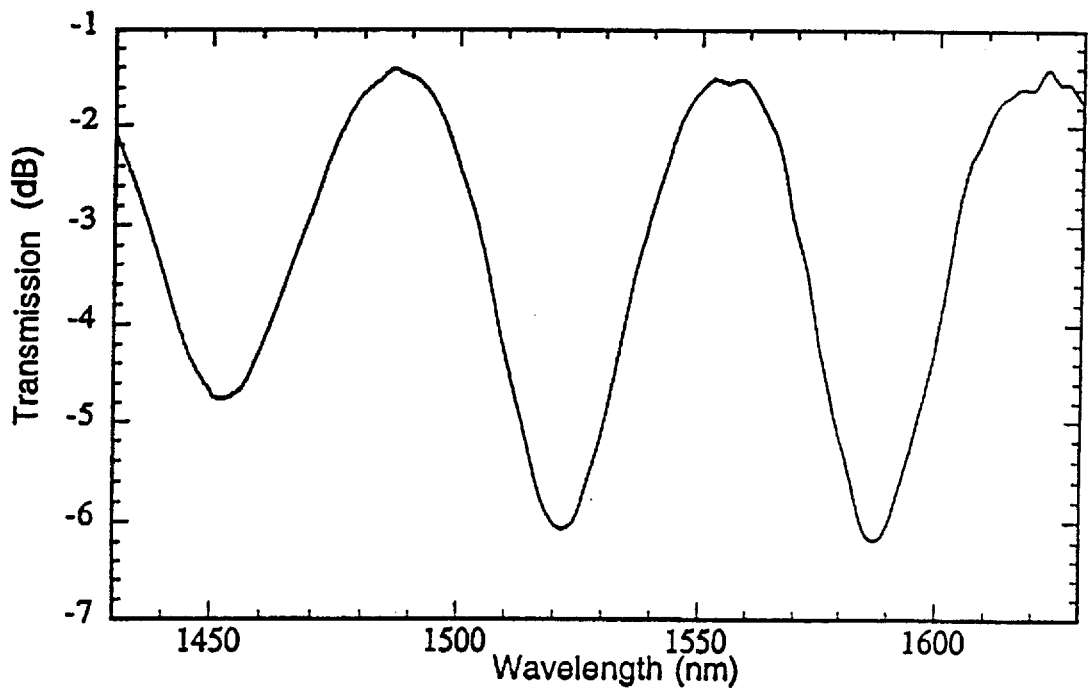
FIG. 8 is a graph obtained during fabrication of the second non-adiabatic taper where the contrast is at 6 dB.
Figure 9:
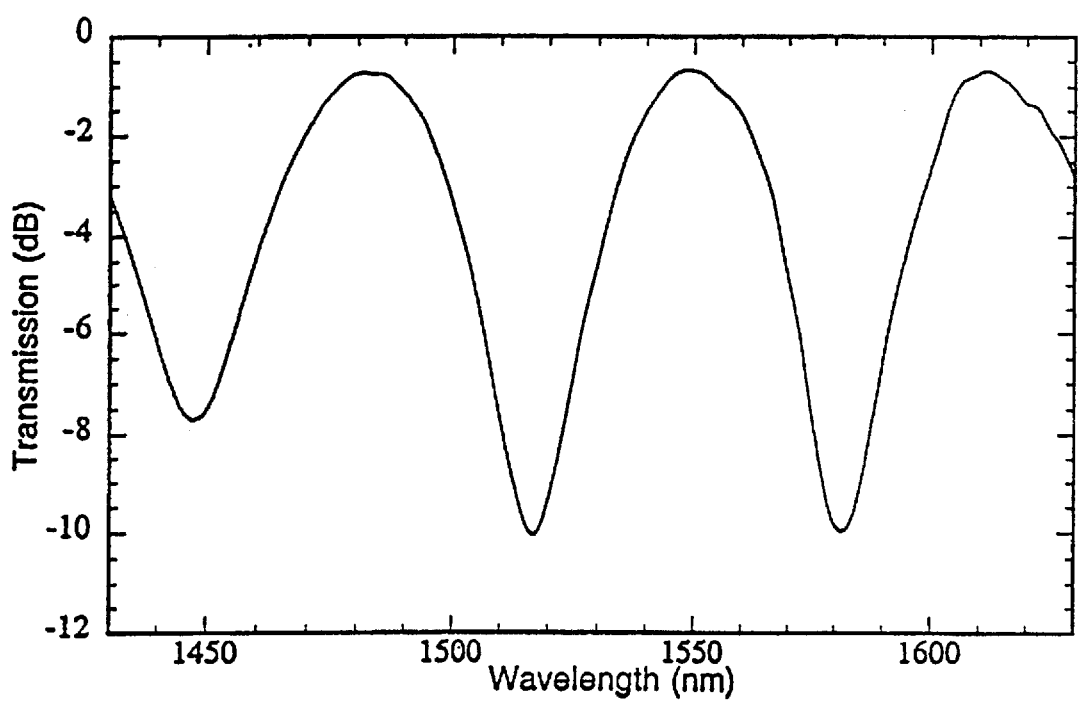
FIG. 9 is a graph such as shown in FIG. 8, but with the contrast doing to 10 dB.
Figure 10:
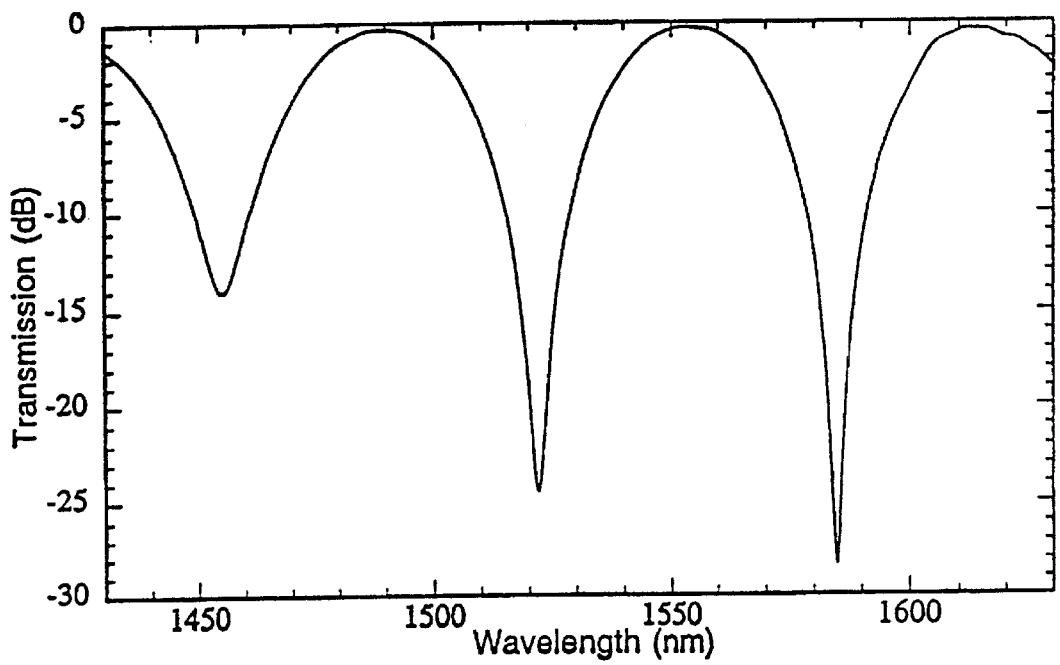
FIG. 10 is a graph where the maximum contrast of 30 dB is reached.

Once the first non-adiabatic taper 44 is so made on one slope of taper 41, a second non-adiabatic taper 46 is made on the other slope to match the coupling of the first non-adiabatic taper. This is illustrated in FIG. 3c and here again a small flame 39 is used to produce taper 46 while slowly pulling the fiber at both ends as shown by arrows 30, 32. This creates a structure as shown in FIG. 2 and FIG. 13c, which has a central beating region 42 and two coupling regions at its extremities produced by non-adiabatic tapers 44 and 46. In producing this structure, the ratio between LP01 and LP02 is readily controlled. If the power splitting is 50% at both ends of the beating region 42, the contrast will be maximum. This is shown by the sinusoidal curves obtained during the fabrication of the second non-adiabatic taper 46. Thus, FIG. 8 shows the Contrast reached at 6 dB, FIG. 9 shows the contrast going to 10 dB and FIG. 10 shows the contrast reaching 30 dB. These spectrums were measured at successive elongation points in the formation of the second non-adiabatic taper 46 as shown in FIG. 3c. once the contrast is at maximum value the pulling process of FIG. 3c is stopped. A good indication that the two non-adiabatic tapers 44, 46 are matched is that the excess loss at the transmission peaks of the filter becomes very low as the elongation progresses, as illustrated in FIG. 10. Thus, to achieve a desired total amplitude of the filter 40, one must produce a non-adiabatic taper on one slope of the zone 41 that is matched by the non-adiabatic taper produced on the slope at the other end of said zone, and has the splitting ratio of half the total amplitude desired. The two non-adiabatic tapers 44 and 46 act as mixing tapers of the filter. Using this technique, because the splitting ratio is not constant with wavelength from the mixing tapers, the maximum amplitude will only be valid over a limited range of wavelength. In the example illustrated in FIG. 10, this range is about 100 nm wide for an amplitude of more than 25 dB. This can be used to create other types of responses as described hereunder.

Figure 11:
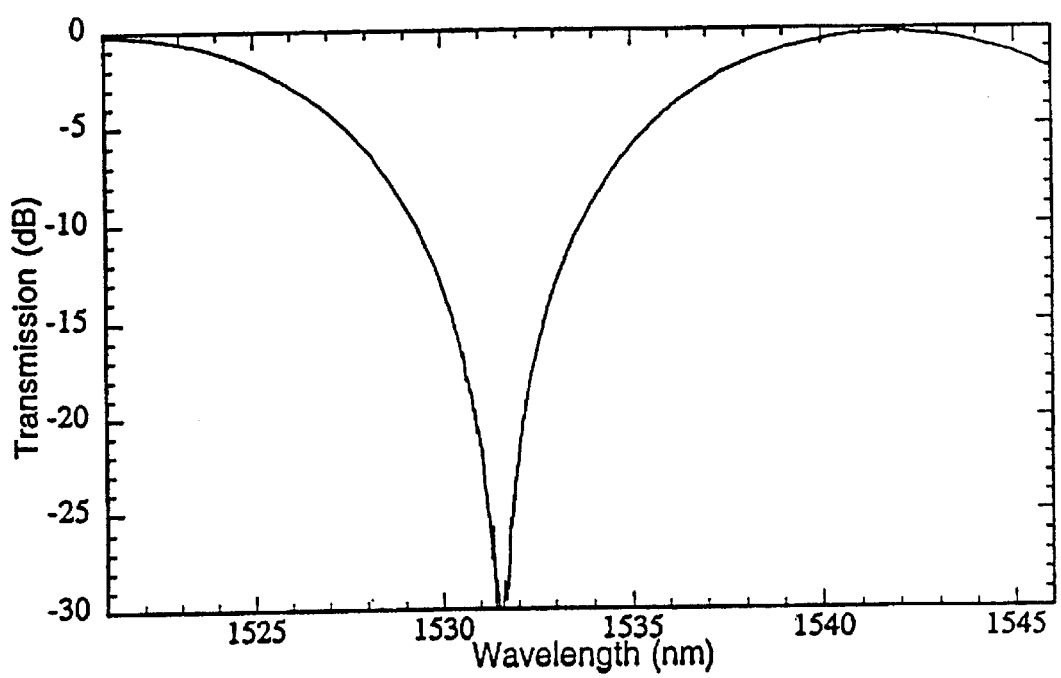
FIG. 11 shows a filter with a spectrum having a period of 20 nm.
Figure 12:
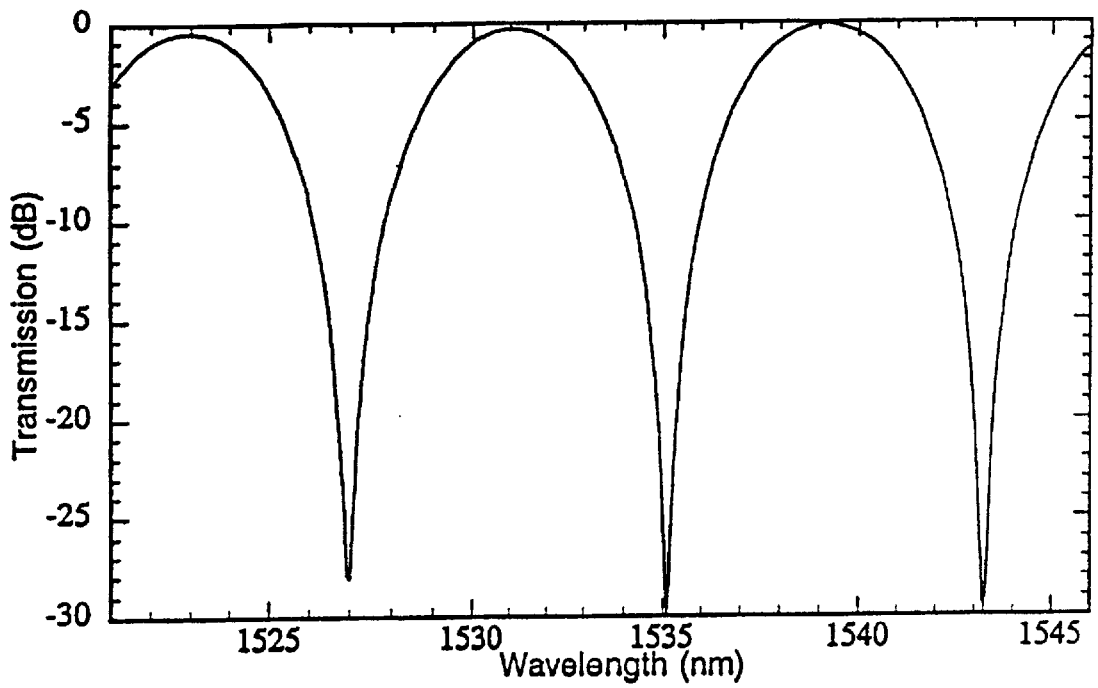
FIG. 12 shows a filter with a spectrum having a period of 8 nm.
Figure 13:
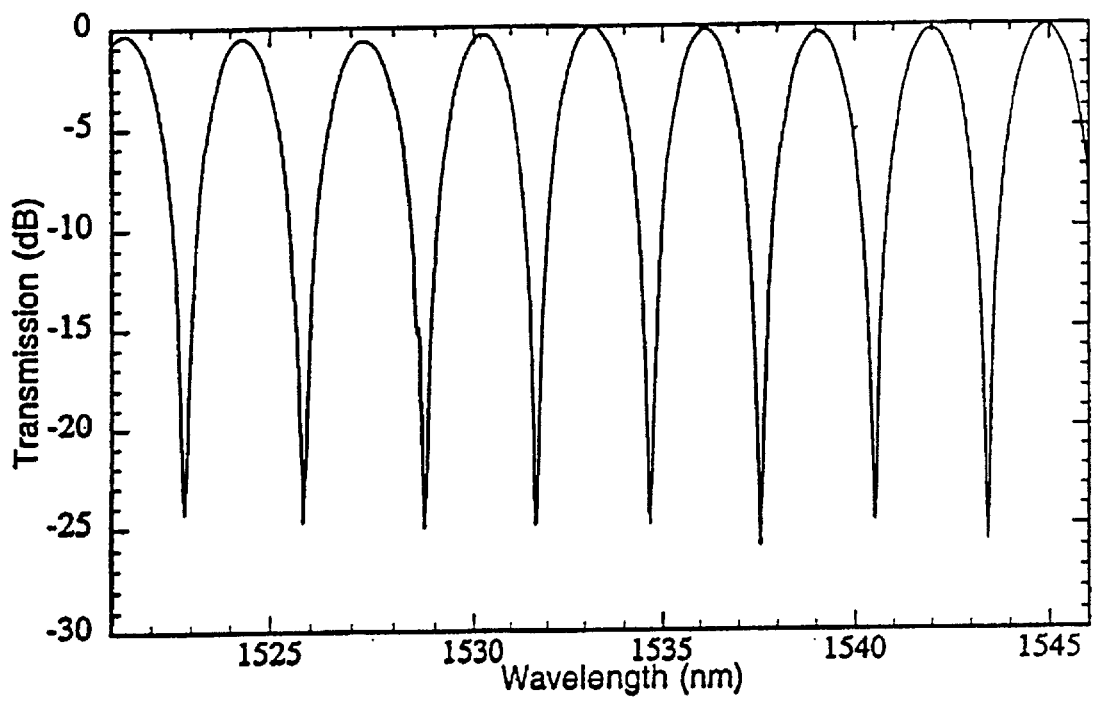
FIG. 13 shows a filter with a spectrum having a period of 3 nm.

From the structure shown in FIG. 3c, it is possible to produce a filter with any period under 100 nm. Because it operates like a taper, elongating the central zone 42 will increase the phase shift between the two modes and reduce accordingly the period of the filter. Thus, FIG. 11 shows a spectrum with a period of 20 nm. After further elongation of the central zone 42, the period as shown in FIG. 12 is now 8 nm. The central zone 42 is then further stretched to a period of 3 nm shown in FIG. 13. The period can thus be adjusted very precisely by going through the elongation fringes one at a time. As one can see from FIGS. 11 to 13, the transmission peak losses do not change with the period, making the process of creating mixing tapers and changing the period independent of each other. The isolation or minimum transmission shown in FIG. 13 is limited by the resolution of the spectrum analyzer.

If desired, the mixing tapers can be made more wavelength dependent by elongating the non-adiabatic tapers, thereby creating a predetermined modulation on the sine period of the filter.

It should be noted that the invention is not limited to the specific embodiment described above, but that various obvious modifications can be made by a person skilled in the art without departing from the spirit of the invention and the scope of the following claims.

What is claimed is:

1. An optical fiber filter which comprises an essentially adiabatic taper in a single-mode fiber, having an elongated central zone with a sloped portion at each end thereof, and on the slope at each end of the central zone there is provided a non-adiabatic taper, thereby forming two mode coupling regions at the extremities of the central zone, adapted to produce a predetermined sinusoidal response in amplitude and wavelength period of the filter.

2. An optical fiber filter according to claim 1, in which the predetermined sinusoidal response is determined by the following relation:

$$T = 1 - \alpha \sin^2[(\lambda - \lambda_o)\Pi/\Lambda]$$

where:
T is the optical transmission of the filter;
$\alpha$ is the amplitude of the filter;
$\lambda$ is the wavelength of the light passing through the filter;
$\lambda_o$ is a reference wavelength or center wavelength of the filter; and
$\Lambda$ is a wavelength period of the filter.

3. An optical fiber filter according to claim 1, wherein the predetermined sinusoidal response has a large amplitude, said filter being provided on the slope at each end of the central zone with a non-adiabatic taper having a reduction in diameter of about 50%.

4. An optical fiber filter according to claim 3, having a maximum amplitude coupling of around 50% at each end of the central zone, with power splitting of 50% at both ends of the central zone.

5. An optical fiber filter according to claim 1, wherein the wavelength period of the filter is controlled by controlling the length of the central zone of the filter between the two non-adiabatic tapers.

6. An optical fiber filter according to claim 1, said filter being provided with a modulation on the wavelength period of the filter by adjusting the width of the non-adiabatic tapers.

7. A method of manufacturing an optical fiber filter which comprises:
  (a) producing an essentially adiabatic taper in a single-mode fiber, having an elongated central zone with a sloped portion at each end thereof; and
  (b) forming a non-adiabatic taper on the slope at each end of the central zone so as to produce a mode coupling region at each said end, such that the two mode coupling regions produce a predetermined sinusoidal response in amplitude and wavelength period of the filter.

8. Method according to claim 7, wherein producing the adiabatic taper includes approaching a torch with a flame to a section of the single-mode fiber stripped of its protective jacket, and brushing the flame on the stripped section of the fiber over a predetermined length while pulling both ends of the fiber until a desired reduction in diameter is obtained in the central zone.

9. Method according to claim 7, wherein producing the adiabatic taper includes pulling both ends of the fiber until a reduction in diameter of about 50% is obtained.

10. Method according to claim 7, wherein forming the non-adiabatic taper on the slope at each end of the central zone includes approaching a torch with a small flame to a predetermined spot on the slope at one end of the central zone, pulling both ends of the fiber until power has decreased to a desired value, and then repeating this procedure at a predetermined spot on the slope at the other end of the central zone.

11. Method according to claim 10, further comprising producing the non-adiabatic tapers at both ends of the central zone, wherein power splitting is 50% at both said ends.

12. Method according to claim 7, further comprising heating and elongating the central zone until a desired wavelength period of the filter is obtained.

13. Method according to claim 7, further comprising elongating the non-adiabatic tapers to create a desired modulation in the wavelength period at the filter.

* * * * *